(12) United States Patent
Wang et al.

(10) Patent No.: US 9,625,779 B2
(45) Date of Patent: Apr. 18, 2017

(54) DISPLAY SUBSTRATE AND METHOD FOR REPAIRING LEAD OF DRIVER INTEGRATED CIRCUIT

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Hui Wang, Beijing (CN); Long Xia, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 64 days.

(21) Appl. No.: 14/424,257

(22) PCT Filed: Dec. 24, 2013

(86) PCT No.: PCT/CN2013/090318
§ 371 (c)(1),
(2) Date: Feb. 26, 2015

(87) PCT Pub. No.: WO2014/173157
PCT Pub. Date: Oct. 30, 2014

(65) Prior Publication Data
US 2015/0212379 A1    Jul. 30, 2015

(30) Foreign Application Priority Data
Apr. 27, 2013 (CN) .......................... 2013 1 0153956

(51) Int. Cl.
*G02F 1/1362* (2006.01)
*G02F 1/1345* (2006.01)

(52) U.S. Cl.
CPC .... *G02F 1/136259* (2013.01); *G02F 1/13452* (2013.01); *G02F 2001/136263* (2013.01)

(58) Field of Classification Search
CPC ........... G02F 1/136259; G02F 1/13452; G02F 2001/136263
See application file for complete search history.

(56) References Cited

U.S. PATENT DOCUMENTS 6,525,705 B1 * 2/2003 Ishii .................... G02F 1/13452
345/87
2007/0040794 A1 * 2/2007 Kwak ............... G02F 1/136259
345/100
(Continued)

FOREIGN PATENT DOCUMENTS

| CN | 101901568 A | 12/2010 |
| CN | 102289119 A | 12/2011 |
| CN | 102650784 A | 8/2012 |

OTHER PUBLICATIONS

International Search Report dated Mar. 19, 2014; PCT/CN2013/090318.
(Continued)

*Primary Examiner* — Minh-Loan Tran
*Assistant Examiner* — Farid Khan
(74) *Attorney, Agent, or Firm* — Ladas & Parry LLP

(57) ABSTRACT

A display substrate and a method for repairing a lead of a driver integrated circuit. The display substrate comprises: multiple signal leads on the display substrate, at least one driver integrated circuit, at least one repair chip (RC), at least one repair lead, and at least one repair line (13). The RC is connected to the at least one driver integrated circuit, the repair lead is connected to the RC, and the repair line crosses signal lines connected to multiple signal leads, and is insulated from the signal lines. When the signal leads connected to the driver integrated circuit is in poor contact, (Continued)

the repair lead and the repair line (13) are used to replace the signal lead in poor contract, which solves a problem that an existing display substrate cannot repair a signal lead in poor contact in an outer lead region, causing wastes of products, and improving costs of the products.

14 Claims, 4 Drawing Sheets

(56) References Cited

U.S. PATENT DOCUMENTS

| | | | | |
|---|---|---|---|---|
| 2007/0206126 | A1* | 9/2007 | Lin | G02F 1/136259 349/54 |
| 2008/0018636 | A1* | 1/2008 | Chang | G09G 3/3685 345/211 |
| 2009/0051844 | A1* | 2/2009 | Chen | G09G 3/006 349/54 |
| 2009/0115959 | A1* | 5/2009 | Lee | G02F 1/136259 349/192 |
| 2010/0157190 | A1* | 6/2010 | Lee | G02F 1/136259 349/54 |
| 2010/0214503 | A1* | 8/2010 | Lee | G02F 1/136259 349/54 |
| 2010/0225870 | A1* | 9/2010 | Park | G02F 1/136204 349/149 |
| 2011/0122105 | A1* | 5/2011 | Itoh | G02F 1/13452 345/204 |
| 2012/0021663 | A1* | 1/2012 | Lee | G02F 1/136259 445/2 |
| 2012/0169986 | A1* | 7/2012 | Kwon | G02F 1/13452 349/139 |
| 2013/0002975 | A1* | 1/2013 | Wen | G02F 1/1309 349/54 |

OTHER PUBLICATIONS

International Preliminary Report on Patentability Appln. No. PCT/CN2013/090318; Dated Oct. 27, 2015.

* cited by examiner

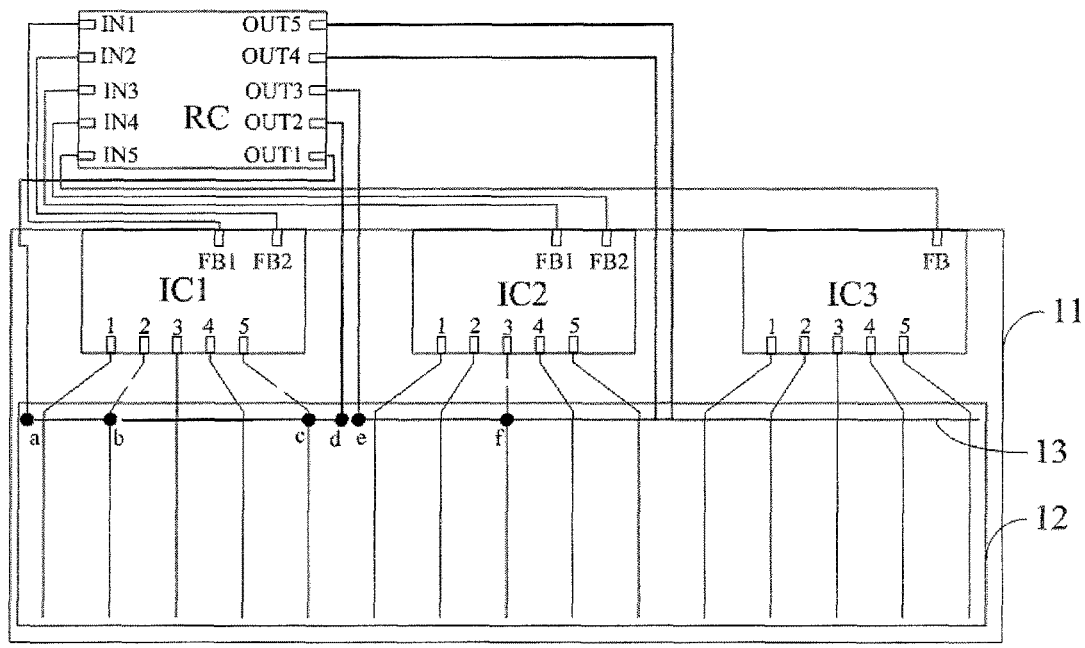

FIG. 3

```
┌─────────────────────────────────────────────┐
│ determining a poor signal lead in the signal leads │
│ connected with the driver IC and transmitting a    │──── S401
│ signal transmitted to the poor signal lead to the  │
│ repair chip                                         │
└─────────────────────────────────────────────┘
                        ▼
┌─────────────────────────────────────────────┐
│ determining a repair lead corresponding to the poor │
│ signal lead in the repair leads connected with the  │
│ repair chip connected with the driver IC and        │──── S402
│ transmitting the signal received by the repair chip to │
│ the repair line through the determined repair lead  │
└─────────────────────────────────────────────┘
                        ▼
┌─────────────────────────────────────────────┐
│ connecting the repair line and the signal line      │──── S403
│ connected with the poor signal lead                 │
└─────────────────────────────────────────────┘
```

FIG. 4

DISPLAY SUBSTRATE AND METHOD FOR REPAIRING LEAD OF DRIVER INTEGRATED CIRCUIT

TECHNICAL FIELD

In general, the embodiments of the present invention relate to the field of display panels, in particular to a display substrate and a method for repairing lead of driver integrated circuit (IC).

BACKGROUND

A liquid crystal display (LCD) comprises an LCD panel, a backlight, a driving circuit board, a flexible circuit board, a source driver IC and a gate driver IC; the LCD panel mainly includes a lower polarizer, an array substrate, liquid crystals, a color filter (CF) substrate and an upper polarizer. The array substrate is provided with horizontal scanning signal lines, vertical data signal lines and thin-film transistor (TFT) switches, the TFT switches are configured to control the transmission of vertical data signals in accordance with horizontal scanning signals. The liquid crystals are interposed between the array substrate and the CF substrate. The orientation of the liquid crystals is controlled by applying voltages to the CF substrate and the array substrate. The CF substrate and the array substrate are sealed by a sealant. Anisotropic conductive adhesive is distributed in the sealant to achieve the conduction of the upper substrate and the lower substrate. As the LCD panel does not emit light, the backlight is required to provide light. The liquid crystals have different orientation angles under different voltages, and the intensity of light running through the liquid crystals is also different. The upper polarizer and the lower polarizer disposed on the outside of the LCD panel may control the polarization directions of light. Polarized light runs through corresponding CF to form monochromatic polarized light. An image pixel is displayed by the combination of three colors, namely red, green and blue. The horizontal scanning signals are configured to control the TFT switches. When the TFT switches are switched on, pixels may be charged. The vertical data signal lines control the orientation angles of the liquid crystals by transmitting signals to pixels. The array substrate is provided with an effective display area and an external lead area. The effective display area is a pixel area and is provided with pixel matrixes. The external lead area is respectively connected with the effective display area and the gate driver IC and the source driver IC and configured to transmit signals of the driving circuit board to the effective display area.

In the traditional LCD panel, two square signal repair lines are disposed along the circumference of the effective display area and configured to repair poor (defective) scanning lines or signal lines in the effective display area. However, if poor signal leads occurs in the external lead area, for instance, poor contact between the signal lead and the source driver IC or the gate driver IC, signal lead disconnection, etc., the leads cannot be repaired in this cases. Thus, if poor signal leads in the external lead area are detected after the cell-assembly process, only product rejection can be adopted for subsequent processing. Therefore, the waste of products can be caused, and hence the cost of products can be increased.

In summary, the traditional LCD panel cannot repair poor signal leads in the external lead area. Thus, the waste of products can be caused, and hence the cost of products can be increased.

In addition, other display panels, e.g., organic light-emitting diode (OLED) display panels, also have the problem of being difficult to repair poor signal leads.

SUMMARY

The embodiments of the present invention provides a display substrate and a method for repairing a lead of driver ICs, which are used for solving the problem of increasing the costs of products due to the waste of products as the traditional display panel cannot repair poor signal leads in the external lead area.

An embodiment of the present invention provides a display substrate, comprising: a plurality of signal leads, at least one driver integrated circuit (IC), at least one repair chip, at least one repair lead and at least one repair line disposed on the display substrate, wherein the repair chip is connected with the at least one driver IC; the repair lead is connected with the repair chip; the repair line is intersected with a plurality of signal lines connected with the plurality of signal leads and insulated from the signal lines; the driver IC configured to output a signal, outputted to a poor signal lead, to the repair chip in the case of the poor signal lead occurring among the signal leads connected with the driver IC; the repair chip is configured to output the received signal which is outputted by the driver IC to the repair lead connected with the repair chip; the repair lead is configured to transmit the received signal outputted by the repair chip to the corresponding repair line; and when the repair line receives the signal from the repair lead, the repair line is connected with a signal line connected with the poor signal lead connected with the repair line and hence transmits the signal to the signal line.

Further, for example, the repair lead is disposed in an external lead area of the display substrate.

Further, for example, the repair line is disposed along an edge of a display area of the display substrate.

Further, for example, the driver IC is provided with a feedback channel; the repair chip is provided with an input channel and an output channel corresponding to the input channel; the input channel of the repair chip is connected with the feedback channel of the driver IC; the output channel of the repair chip are connected with the repair lead; the driver IC is configured to: output a signal, outputted to poor signal lead, to the repair chip through the feedback channel corresponding to the signal lead in the case of the poor signal lead; and the repair chip is configured to: receive the signal, outputted by the driver IC through the feedback channel of the driver IC, from the input channel of the repair chip, and output the received signal to the repair lead connected with the output channel through the corresponding output channel.

Further, for example, the driver ICs are source driver ICs; the plurality of signal leads on the display substrate are signal leads of data lines; and the repair line is configured to transmit the received signal which is transmitted from the repair lead to a data line connected with the poor signal lead connected with the repair line.

Further, for example, the driver ICs are gate driver ICs; the plurality of signal lines on the display substrate are signal leads of scanning lines; and the repair line is configured to transmit the received signal which is transmitted from the repair lead to a scanning line connected with the poor signal lead connected with the repair line.

Further, for example, the repair line and the signal lines connected with the plurality of signal leads on the display substrate are intersected with each other, arranged on different layers of the display substrate, and electrically insulated through an insulating layer.

Further, for example, when the repair line receives the signal transmitted by the repair lead, the repair line is connected with a signal line connected with the poor signal lead and transmits the received signal transmitted by the repair lead to the signal line.

Further, for example, the driver IC is disposed on the display substrate. Or the driver IC is disposed on a flexible circuit board which is configured to connect the display substrate and a driving circuit board for providing driving signals to the display substrate.

Another embodiment of the present invention provides a method for repairing a lead of driver ICs, comprising: providing at least one repair chip, at least one repair lead and at least repair line, wherein the at least one repair chip is connected with the driver IC; the at least one repair lead is connected with the repair chip; and the repair line is intersected with signal lines connected with signal leads connected with the driver IC and insulated from the signal lines; determining a poor signal lead occurring in the signal leads connected with the driver IC and transmitting a signal transmitted to the poor signal lead to the repair chip; determining a repair lead corresponding to the poor signal lead in the repair chip connected with the driver IC and transmitting the signal received by the repair chip to the repair line through the repair lead determined; and connecting the repair lead and the signal line connected with the poor signal lead.

Further, for example, in the case of a short-circuit signal lead for the poor signal lead, before determining the repair lead connected with the poor signal lead in the repair chip, further comprising: disconnecting a short-circuit connection point in the short-circuit signal lead from other portions of the short-circuit signal lead.

Further, for example, in the case of a plurality of poor signal leads occurring, after connecting the repair line and the signal line connected with the poor signal lead, further comprising: disconnecting a part, between a connection point of the repair line and corresponding repair lead for repairing each poor signal lead and a connection point of the repair line and a signal line corresponding to the signal lead, from other parts of the repair line.

The embodiments of the present invention have the following advantages that:

In the display substrate and the lead repair method of the driver ICs, provided by the embodiments of the present invention, in the case of the poor signal lead occurring among the signal leads connected with the driver IC, a signal originally outputted to the poor signal lead is outputted to a repair chip; the repair chip outputs the received signal outputted by the driver IC to a repair lead connected with the repair chip; the repair lead transmits the received signal outputted by the repair chip to a repair line; the repair line transmits the received signal outputted by the repair lead to a signal line connected with the poor signal lead connected with the repair line; and the repair lead and the repair line, in place of the poor signal lead, transmit the signal to the signal line connected with the poor signal lead and further transmit the signal to TFT switches of pixels connected with the signal line. As the repair lead is disposed in the external lead area and the repair line is disposed in the edge of the display area of the display substrate, in the case of poor signal lead in the external lead area, the repair lead and the repair line may transmit signals in place of the poor signal lead and hence have the effect of repairing the poor signal lead in the external lead area. Thus, the waste of products caused by the poor signal leads in the external lead area can be avoided, and hence the cost of products can be reduced.

BRIEF DESCRIPTION OF THE DRAWINGS

FIG. 3 is a schematic structural view of a display substrate provided by still another embodiment of the present invention;

FIG. 4 is a flowchart of a method for repairing a lead of driver ICs, provided by one embodiment of the present invention;

DETAILED DESCRIPTION

Figure 1:
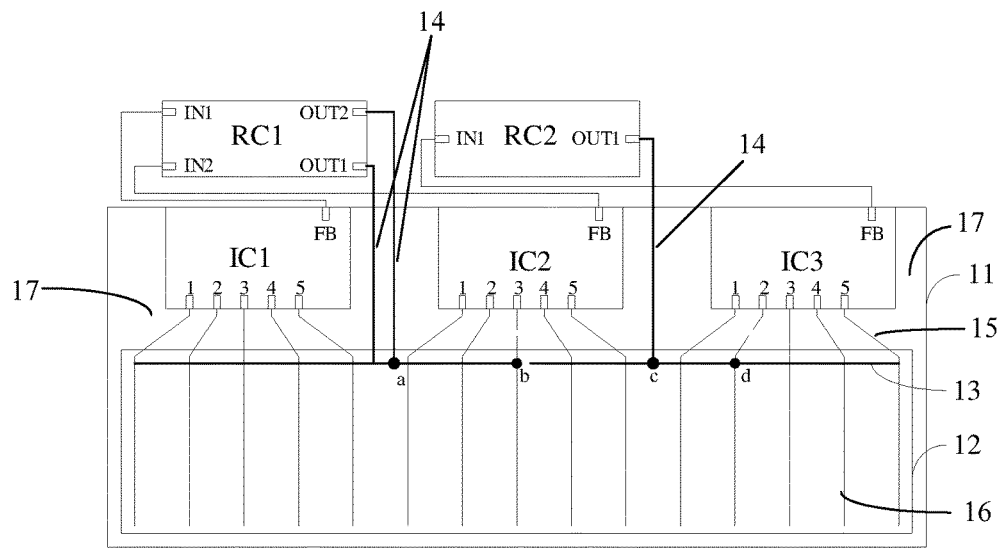
FIG. 1 is a schematic structural view of a display substrate provided by one embodiment of the present invention.

Embodiments of the present invention provide a display substrate and a method for repairing a lead of driver ICs. Repair leads and repair lines in a display area of the display substrate, in place of poor (defective) signal leads, transmit signals outputted to the poor signal leads by the driver ICs to signal lines connected with the poor signal leads and further transmit the signals to TFT switches of pixels connected with the signal lines. Thus, the function of repairing the poor signal leads in the external lead area can be achieved. Therefore, the waste of products caused by the poor signal leads in the external lead area can be avoided, and hence the cost of products can be reduced.

Description will be given below to the preferred embodiments of the display substrate and the lead repair method of the driver ICs, provided by the embodiment of the present invention, with reference to the accompanying drawings.

An embodiment of the present invention provides a display substrate, which comprises: a plurality of signal leads, at least one driver integrated circuit (hereinafter "IC"), at least one repair chip, at least one repair lead and at least one repair line disposed on the display substrate. The repair chip is connected with the at least one driver IC; the repair lead is disposed in an external lead area of the display substrate and connected with the repair chip; and the repair line is disposed in a display area of the display substrate, intersected with signal lines which are connected with the plurality of signal leads, and insulated from the plurality of signal lines.

The driver IC is configured to output a signal outputted to a poor signal lead to the repair chip in the case of the signal leads connected with the driver IC being suffering a defect.

The repair chip is configured to output the received signal which is outputted by the driver IC to the repair lead connected with the repair chip.

The repair lead is configured to transmit the received signal outputted by the repair chip to the repair line.

The repair line is configured to transmit the received signal which is transmitted from the repair lead to a signal line connected with the poor signal lead connected with the repair line.

The display substrate may be an upper substrate or a lower substrate of a display panel. Typically, the upper substrate of the display panel is a color filter (CF) substrate, and the lower substrate is an array substrate. Both the CF substrate and the array substrate may be taken as the display substrate provided by an embodiment of the present invention, which is not limited in the present invention. Generally, the array substrate is provided with a plurality of data lines and a plurality of scanning lines; the driver ICs are disposed on the array substrate; and display is achieved by the electrical connection between leads and the data lines and that between leads and the scanning lines in a display area. Of course, the driver ICs may also be disposed on the CF substrate, and display is achieved by transmitting signals of the driver ICs to the data lines and the scanning lines of the array substrate through conductive spacers or other conductive structures. Description is given to the following embodiments of the present invention by taking the case that the display substrate is the array substrate as an example.

An array substrate includes a display area and an external lead area. The driver ICs effect display drive by transmitting signals to a plurality of corresponding signal lines in the display area through a plurality of signal leads in the external lead area. The repair line is typically disposed along the edge of the display area and may be electrically connected with the signal line connected with a poor signal lead when it is used to repair the poor signal lead. That is to say, the arrangement position of the repair line is close to the position at which the signal lines and the signal leads are connected. Also, for the repair line to be able to repair signal lines, the repair line is generally intersected with the signal lines. The intersection arrangement refers to that: if the signal lines are a plurality of vertical lines, the repair line may be a horizontal line and intersected with the signal lines; conversely, if the signal lines are a plurality of horizontal lines, the repair line may be a vertical line and intersected with the signal lines. Of course, the embodiments of the present invention are not limited thereto. The insulation of the repair line and the signal lines connected with the plurality of signal leads on the array substrate may be achieved by the following ways: the repair line and the plurality of signal lines connected with the plurality of signal leads on the array substrate are arranged on different layers of the array substrate, an insulating layer is disposed between the layer provided with the repair line and the layer provided with the plurality of signal lines connected with the plurality of signal leads on the array substrate. In this way, the insulation of the repair line and the plurality of signal lines connected with the plurality of signal leads on the array substrate can be achieved.

The repair line transmits the received signal which is transmitted from the repair lead to the signal line connected with the poor signal lead, which is in turn connected with the repair line, and this operation may be achieved by the following ways: the repair line is connected with a part, connected with the signal line, of the poor signal lead and hence transmits the received signal transmitted from the repair lead to the signal line and further transmits the signal to TFT switches of pixels connected with the signal line.

The repair lead may be connected with the repair line and may also be insulated from the repair line. When the repair lead and the repair line are insulated from each other, the repair lead and the plurality of signal leads on the array substrate may be arranged on the same layer of the array substrate.

When the driver IC is a source driver IC, the plurality of signal leads on the array substrate are signal leads of data lines, and the repair line is specifically configured to transmit the received signal which is transmitted from the repair lead to the signal line (namely the data line) connected with the poor signal lead of data line which is in turn connected with the repair line.

When the driver IC is a gate driver IC, the plurality of signal leads on the array substrate are signal leads of scanning lines, and the repair line is specifically configured to transmit the received signal which is transmitted from the repair lead to the signal line (namely the scanning line) connected with the poor signal lead of scanning line which is in turn connected with the repair line.

The number of the repair line may be one or plural. Two repair lines may be respectively arranged when not only a poor scanning line in the external lead area must be repaired but also a poor data line in the external lead area must be repaired.

The driver ICs may be disposed on the array substrate in the display panel and may also be disposed on a flexible circuit board. The flexible circuit board is configured to connect the array substrate and a driving circuit board. The driving circuit board is configured to provide driving signals for the driver ICs. The source driver ICs convert the driving signals provided by the driving circuit into pixel voltages, and the gate driver ICs convert the driving signals provided by the driving circuit into a gate voltage for TFT switches.

The display substrate provided by the embodiments of the present invention may be configured to repair a poor signal lead in signal leads connected with one driver IC and may also be configured to repair poor signal leads in signal leads connected with a plurality of driver ICs.

Moreover, the driver IC is configured to: in the case of one poor signal lead, output a signal, outputted to the poor signal lead, to the repair chip through a feedback channel corresponding to the signal lead in the driver IC. The feedback channel corresponding to one signal lead in the driver IC refers to that: in the case of poor signal lead, the driver IC outputs the signal, outputted to the signal lead, from the feedback channel. As each signal lead is connected with one output channel of the driver IC, the corresponding relationship between the signal lead and the feedback channel in the driver IC is reflected by the corresponding relationship between an output channel in the driver IC and the feedback channel in the driver IC. The corresponding relationship may be preset.

The repair chip is configured to: receive the signal, outputted by the driver IC through one feedback channel of the driver IC, through one input channel of the repair chip, and output the received signal to the repair lead connected with the output channel from corresponding output channel according to the corresponding relationship between input channels and output channels of the repair chip. The output channel, corresponding to one input channel, in the repair chip refers to that: the repair chip outputs the received signal through corresponding output channel when receiving the signal from the input channel. The corresponding relationship between the input channels and the output channels in the repair chip is preset. In addition, each feedback channel of each driver IC is connected with one input channel in one repair chip. The corresponding relationship between the feedback channel in the driver IC and the input channel in the repair chip is also preset.

Description will be given below to the working mode of the driver ICs and the repair chips under different conditions by an example of three driver ICs in the array substrate. In the array substrate, the repair line and the repair lead are arranged on different layers of the array substrate; and an insulating layer is disposed between the layer provided with the repair line and the layer provided with the repair lead.

The repair line and the repair lead may be welded together by laser irradiation, for instance, may be welded by laser irradiation via a microscope with laser emission function and the like.

Embodiment 1

As illustrated in FIG. 1, a source driver IC1, a source driver IC2 and a source driver IC3 are respectively provided with a feedback channel FB. Thus, the feedback channel corresponding to the poor signal lead among the signal leads 15 of the data lines connected with output channels of the source driver IC1 is the feedback channel FB of the source driver IC1; the feedback channel corresponding to the poor signal lead among the signal leads 15 of the data lines connected with the output channels of the source driver IC2 is the feedback channel FB of the source driver IC2; and the feedback channel corresponding to the poor signal lead among the signal leads 15 of the data lines connected with the output channels of the source driver IC3 is the feedback channel FB of the source driver IC3. The feedback channel FB in the source driver IC1 is connected with an input channel IN1 of a repair chip RC1; the feedback channel FB in the source driver IC2 is connected with an input channel IN2 of the repair chip RC1; and the feedback channel FB in the source driver IC3 is connected with an input channel IN1 of a repair chip RC2. One output channel of each source driver IC is connected with one data line through a signal lead 15 of data line. As illustrated in FIG. 1, the source driver IC1, the source driver IC2 and the source driver IC3 are disposed on an array substrate 11, and a repair line 13 is disposed in a display area 12 of the array substrate 11. Other input channels and other output channels in the repair chips RC1 and RC2 are not shown in FIG. 1. The input channel IN1 in the repair chip RC1 corresponds to an output channel OUT1 in the RC1; the input channel IN2 in the repair chip RC1 corresponds to an output channel OUT2 in the RC1; and the input channel IN1 in the repair chip RC2 corresponds to an output channel OUT1 in the RC2.

Supposing that a data line connected with an output channel 3 of the source driver IC2 becomes poor (defective) in the external lead area 17 and a data line connected with an output channel 2 of the source driver IC3 becomes poor (defective) in the external lead area 17. FIG. 1 illustrates the disconnection of the signal leads 15 of the two data lines in the external lead area 17.

At this point, the source driver IC2 outputs the signal, outputted to a signal lead 15 of data line from the output channel 3, to the repair chip RC1 from the feedback channel FB of the source driver IC2; the repair chip RC1 determines that the signal is received from the source driver IC2 according to the input channel IN2 for receiving the signal; the repair chip RC1 outputs the signal, received through the input channel IN2, to a repair lead 14 connected with the output channel OUT2 from the output channel OUT2 corresponding to the input channel IN2; by laser irradiation, the repair lead 14 is connected with the repair line 13, and the repair line 13 is also connected with the signal line 16 (namely a data line) connected with the poor signal lead 15 connected with the output channel 3 of the source driver IC2; and hence normal display can be achieved by transmitting the signal to source electrodes of TFT switches (the TFT switches are not shown in FIG. 1 and are disposed in the display area 12) of pixels connected with the data line. Thus, the poor signal lead connected with the output channel 3 of the source driver IC2 can be repaired.

The source driver IC3 outputs the signal, outputted to a signal lead 15 of data line from the output channel 2, to the repair chip RC2 from the feedback channel FB of the source driver IC3; the repair chip RC2 determines that the signal is received from the source driver IC3 according to the input channel IN1 for receiving the signal; the repair chip RC2 outputs the signal, received through the input channel IN1, to the repair lead 14 connected with the output channel OUT1 from the output channel OUT1 corresponding to the input channel IN1; by laser irradiation, the repair lead 14 is connected with the repair line 13, and the repair line 13 is also connected with a signal line 16 (namely a data line) connected with the poor signal lead connected with the output channel 2 of the source driver IC3; and hence normal display can be achieved by transmitting the signal to source electrodes of TFT switches (the TFT switches are not shown in FIG. 1 and are disposed in the display area 12) of pixels connected with the data line. Thus, the poor signal lead connected with the output channel 2 of the source driver IC3 can be repaired.

As the repair line 13 not only connects a part, connected with a corresponding signal line 16, of the poor signal lead connected with the output channel 3 of the source driver IC2 and the repair lead 14 connected with the output channel OUT2 of the repair chip RC1 but also connects a part, connected with another corresponding signal line 13, of the poor signal lead connected with the output channel 2 of the source driver IC3 and the repair lead 14 connected with the output channel OUT1 of the repair chip RC2, a portion between a connection point "a" and a connection point "b" and a portion between a connection point "c" and a connection point "d" of the repair line 13 must be disconnected with each other to avoid signal interference. Here, the connection point "a" is a connection point between the repair line 13 and the repair lead 14 connected with the output channel OUT2 of the repair chip RC1; the connection point "b" is a connection point between the repair line 13 and the part, connected with a corresponding signal line 16, of the poor signal lead connected with the output channel 3 of the source driver IC2; the connection point "c" is a connection point between the repair line 13 and the repair lead 14 connected with the output channel OUT1 of the repair chip RC2; and the connection point "d" is a connection point between the repair line 13 and the part, connected with another corresponding signal line 16, of the poor signal lead connected with the output channel 2 of the source driver IC3.

But the source driver IC1 does not detect any poor signal lead among the signal leads 15 of data lines connected with the output channels of the source driver IC1. Thus, the feedback channel FB of the source driver IC1 will not output the signal.

Embodiment 2

Figure 2:
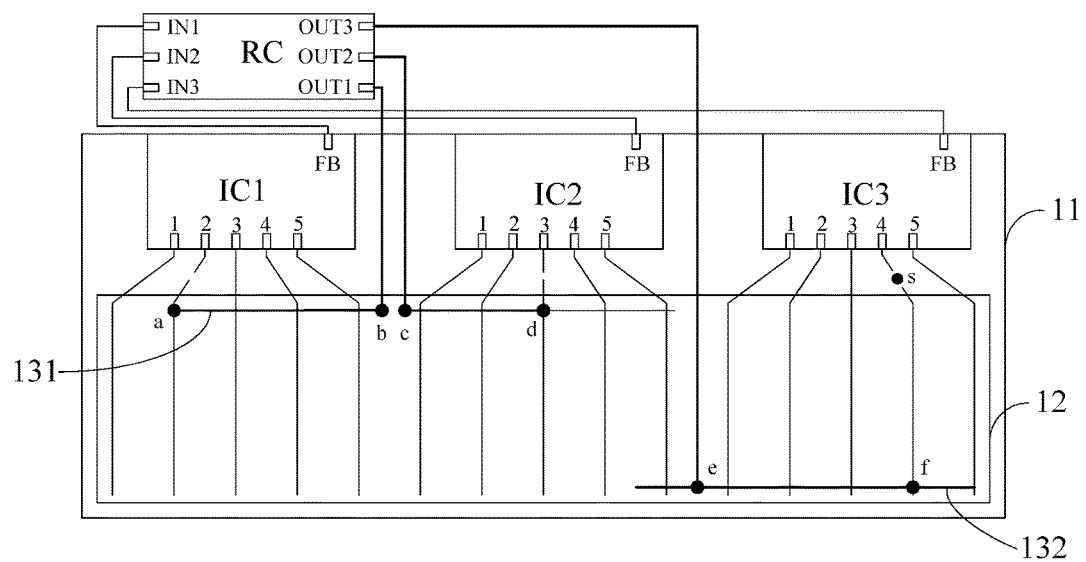
FIG. 2 is a schematic structural view of a display substrate provided by another embodiment of the present invention.

As illustrated in FIG. 2, a source driver IC1, a source driver IC2 and a source driver IC3 are respectively provided with a feedback channel FB. Thus, the feedback channel corresponding to the poor signal lead among the signal leads of the data lines connected with the output channels of the source driver IC1 is the feedback channel FB of the source driver IC1; the feedback channel corresponding to the poor signal lead among the signal leads of the data lines connected with the output channels of the source driver IC2 is the feedback channel FB in the source driver IC2; and the feedback channel corresponding to the poor signal lead among the signal leads of the data lines connected with the output channels of the source driver IC3 is the feedback channel FB in the source driver IC3. The feedback channel FB in the source driver IC1 is connected with an input channel IN1 of a repair chip RC; the feedback channel FB in the source driver IC2 is connected with an input channel IN2 of the repair chip RC; and the feedback channel FB in the source driver IC3 is connected with an input channel IN3 of the repair chip RC. One output channel of each source driver IC is connected with one data line. As illustrated in FIG. 2, the source driver IC1, the source driver IC2 and the source driver IC3 are disposed on an array substrate 11, and a repair line 131 and a repair line 132 are disposed in a display area 12 of the array substrate 11. Other input channels and other output channels in the repair chip RC are not shown in FIG. 1. The input channel IN1 and an output channel OUT1 in the repair chip RC correspond to each other; the input channel IN2 and an output channel OUT2 in the repair chip RC correspond to each other; and the input channel IN3 and an output channel OUT3 in the repair chip RC correspond to each other.

Supposing that the data line connected with an output channel 2 of the source driver IC1 becomes poor (defective) in the external lead area and the data line connected with an output channel 3 of the source driver IC2 becomes poor in the external lead area. As seen from FIG. 2, the signal leads of these two data lines are disconnected (open). In addition, supposing that the data line connected with an output channel 4 of the source driver IC3 becomes poor in the external lead area. As seen from FIG. 2, the signal lead of the data line is short-circuited. The short circuit of the signal lead connected with the driver IC may be caused by the short circuit between the signal lead and a common electrode of a CF substrate in a display panel through conductive metal balls in an anisotropic conductive adhesive of a sealant or may be caused by other reasons. Because the driver IC can output a signal outputted to a signal lead to a repair chip connected with the driver IC through the feedback channel of the driver IC only if detecting that the resistance of the signal lead connected with the driver IC becomes infinitely large, namely when the signal lead connected with the driver IC is disconnected, in the case of the short circuit of the signal lead being determined, a short-circuit connection point on the signal lead must be disconnected from other parts of the signal lead at first. Thus, a short-circuit connection point "s" on the signal lead of the data line connected with the output channel 4 of the source driver IC3 must be disconnected from other parts of the signal lead of data line. The short circuit of the signal lead may, for instance, be determined by the waveform of the signal line and the displayed image. Moreover, the disconnection operation may, for instance, be conducted by a device such as a microscope with laser emission function.

At this point, the source driver IC1 outputs a signal, outputted to a signal lead of the data line from the output channel 2, to the repair chip RC from the feedback channel FB of the source driver IC1; the repair chip RC determines that the signal is received from the source driver IC1 according to the input channel IN1 for receiving the signal; the repair chip RC outputs the signal, received through the input channel IN1, to the repair lead connected with the output channel OUT1 from the output channel OUT1 corresponding to the input channel IN1; by laser irradiation, the repair lead is connected with the repair line 131, and the repair line 131 is also connected with a part, connected with a signal line (namely a data line), of the poor signal lead connected with the output channel 2 of the source driver IC1; and hence normal display can be achieved by transmitting the signal to the source electrodes of TFT switches (the TFT switches are not shown in FIG. 2 and are disposed in the display area 12) of pixels connected with the data line. Thus, the poor signal lead connected with the output channel 2 of the source driver IC1 can be repaired.

The source driver IC2 outputs a signal, outputted to a signal lead of the data line from the output channel 3, to the repair chip RC from the feedback channel FB of the source driver IC2; the repair chip RC determines that the signal is received from the source driver IC2 according to the input channel IN2 for receiving the signal; the repair chip RC outputs the signal, received through the input channel IN2, to the repair lead connected with the output channel OUT2 from the output channel OUT2 corresponding to the input channel IN2; by laser irradiation, the repair lead is connected with the repair line 131, and the repair line 131 is also connected with a part, connected with a signal line (namely a data line), of the poor signal lead connected with the output channel 3 of the source driver IC2; and hence normal display can be achieved by transmitting the signal to the source electrodes of TFT switches (the TFT switches are not shown in FIG. 2 and are disposed in the display area 12) of pixels connected with the data line. Thus, the poor signal lead of data line connected with the output channel 3 of the source driver IC2 can be repaired.

The source driver IC3 outputs a signal, outputted to the signal lead of the data line from the output channel 4, to the repair chip RC from the feedback channel FB of the source driver IC3; the repair chip RC determines that the signal is received from the source driver IC3 according to the input channel IN3 for receiving the signal; the repair chip RC outputs the signal, received through the input channel IN3, to a repair lead connected with the output channel OUT3 from the output channel OUT3 corresponding to the input channel IN3; by laser irradiation, the repair lead is connected with the repair line 132, and the repair line 132 is connected with a part, connected with a signal line (namely a data line), of the poor signal lead connected with the output channel 4 of the source driver IC3; and hence normal display can be achieved by transmitting the signal to the source electrodes of TFT switches (the TFT switches are not shown in FIG. 2 and are disposed in the display area 12) of pixels connected with the data line. Thus, the poor signal lead of data line connected with the output channel 4 of the source driver IC3 can be repaired.

Because the repair line 131 not only connects the portion, connected with the signal line (namely the data line), of the poor signal lead connected with the output channel 2 of the source driver IC1 and the repair lead connected with the output channel OUT1 of the repair chip RC, but also connects the portion, connected with the signal line (namely the data line), of the poor signal lead connected with the output channel 3 of the source driver IC2 and the repair lead connected with the output channel OUT2 of the repair chip RC, the portion between a connection point "a" and a connection point "b" and the portion between a connection point "c" and a connection point "d" on the repair line 131 must be disconnected from each other to avoid signal interference; here the connection point "b" is the connection point between the repair line 131 and the repair lead connected with the output channel OUT1 of the repair chip RC; the connection point "a" is the connection point between the repair line 131 and the part, connected with the signal line (namely the data line), of the poor signal lead connected with the output channel 2 of the source driver IC1; the connection point "c" is the connection point between the repair line 131 and the repair lead connected with the output channel OUT2 of the repair chip RC; and the connection point "d" is the connection point between the repair line 131 and the part, connected with the signal line (namely the data line), of the poor signal lead connected with the output channel 3 of the source driver IC2.

But the repair line 132 only connects the part, connected with the signal line (namely the data line), of the poor signal lead of the data line connected with the output channel 4 of the source driver IC3 and the repair lead connected with the output channel OUT3 of the repair chip RC, so the signal interference will not occur. Thus, the portion between a connection point "e" and a connection point "f" may be not necessarily disconnected from other portions of the repair line 132; here the connection point "e" is the connection point between the repair line 132 and the repair lead connected with the output channel OUT3 of the repair chip RC; and the connection point "f" is the connection point between the repair line 132 and the part, connected with the signal line (namely the data line), of the poor signal lead of the data line connected with the output channel 4 of the source driver IC3.

Embodiment 3

When one driver IC is provided with a plurality of feedback channels, the corresponding relationship between the feedback channels in the driver IC and poor signal leads among the signal leads of data lines connected with output channels of the driver IC is as follows: the serial number of the output channel connected with the poor signal lead in the driver IC is taken as a new serial number of the signal lead connected with the output channel; the poor signal lead connected with the driver IC is sorted according to the new serial number thereof; and the driver IC outputs a signal outputted to the poor signal lead to the feedback channel, of which the serial number is the same as the new serial number of the poor signal lead acquired after sorting. As seen from the above corresponding relationship, the number of the feedback channels in the driver IC is equal to the maximum amount of the poor signal leads, capable of being repaired, in the signal leads connected with the driver IC. For instance, if one driver IC is provided with two feedback channels, not greater than two poor signal leads in the signal leads connected with the driver IC can be repaired. In addition, the number of input channels in the repair chip is equal to the sum of the number of feedback channels in driver ICs connected with the repair chip. One input channel in one repair chip is connected with one feedback channel in one driver IC connected with the repair chip, and one feedback channel in one driver IC is connected with one input channel in the repair chip connected with the driver IC. Moreover, input channels in one repair chip are in one-to-one correspondence with output channels in the repair chip. The output channels in one repair chip are respectively connected with one repair lead.

As illustrated in FIG. 3, a source driver IC1 and a source driver IC2 are respectively provided with two feedback channels, and a source driver IC3 is provided with one feedback channel FB. Thus, the serial numbers of poor signal leads of data lines in data lines connected with output channels in the source driver IC1 are determined at first. As a signal lead of data line connected with an output channel 2 of the source driver IC1 is poor and a signal lead of data line connected with an output channel 5 of the source driver IC1 is poor, the serial numbers of the poor signal leads of data lines in the data lines connected with the source driver IC1 are 2 and 5. If the serial numbers are sorted according to the order from small to large, the new serial number of the data line with the serial number 2 is 1, and the new serial number of the data line with the serial number 5 is 2. Of course, the serial numbers may also be sorted according to the order from large to small and may also be sorted by other means. In this case, the source driver IC1 outputs a signal, outputted to the signal lead of data line connected with the output channel 2, to a repair chip RC from a feedback channel FB1 of the source driver IC1, and outputs a signal, outputted to the signal lead of data line connected with the output channel 5, to the repair chip RC from a feedback channel FB2 of the source driver IC1. A signal lead of data line connected with an output channel 3 of the source driver IC2 is poor. Thus, the serial number of the poor signal lead in signal leads of data lines connected with the source driver IC2 is 3. In the case of sorting, the new serial number of the signal lead of data line with the serial number 3 is 1. The source driver IC2 outputs a signal, outputted to the signal lead of data line connected with the output channel 3, to the repair chip RC from a feedback channel FB1, of which the serial number is the same as the new serial number 1 of the poor signal lead. As the source driver IC3 is provided with one feedback channel FB, the poor signal lead in signal leads of data lines connected with output channels of the source driver IC3 can only correspond to the feedback channel FB of the source driver IC3.

As illustrated in FIG. 3, the source driver IC1, the source driver IC2 and the source driver IC3 are disposed on an array substrate 11, and a repair line 13 is disposed in a display area 12 of the array substrate 11. In the repair chip RC, an input channel IN1 corresponds to an output channel OUT1; an input channel IN2 corresponds to an output channel OUT2; an input channel IN3 corresponds to an output channel OUT3; an input channel IN4 corresponds to an output channel OUT4; and an input channel IN5 corresponds to an output channel OUT5. In addition, the input channel IN1 in the repair chip RC is connected with the feedback channel FB1 of the source driver IC1; the input channel IN2 in the repair chip RC is connected with the feedback channel FB2 of the source driver IC1; the input channel IN3 in the repair chip RC is connected with the feedback channel FB1 of the source driver IC2; the input channel IN4 in the repair chip RC is connected with the feedback channel FB2 of the source driver IC2; and the input channel IN5 in the repair chip RC is connected with the feedback channel FB of the source driver IC3. Other input channels and other output channels in the repair chip RC are not shown in FIG. 3.

As illustrated in FIG. 3, both the data line connected with the output channel 2 of the source driver IC1 and the data line connected with the output channel 5 of the source driver IC1 are poor in the external lead area; the data line connected with the output channel 3 of the source driver IC2 is poor in the external lead area; and the signal leads of the three data lines in FIG. 3 are disconnected.

At this point, the source driver IC1 outputs a signal, outputted to the signal lead of data line from the output channel 2, to the repair chip RC from the feedback channel FB of the source driver IC1; the repair chip RC determines that the signal is received from the source driver IC1 according to the input channel IN1 for receiving the signal; the repair chip RC outputs the signal, received through the input channel IN1, to a repair lead connected with the output channel OUT1 from the output channel OUT1 corresponding to the input channel IN1; by laser irradiation, the repair lead is connected with a repair line 13, and a connection point between the repair lead and the repair line 13 is a connection point "a"; the repair line 13 is also connected with a part, connected with a signal line (namely a data line), of the poor signal lead connected with the output channel 2 of the source driver IC1, and a connection point between the repair line 13 and the part is a connection point "b"; and hence the poor signal lead of data line connected with the output channel 2 of the source driver IC1 can be repaired. Similarly, the source driver IC1 outputs a signal, outputted to the signal lead of data line from the output channel 5, to the repair chip RC from the feedback channel FB2 of the source driver IC1; the repair chip RC determines that the signal is received from the feedback channel FB2 of the source driver IC1 according to the input channel IN2 for receiving the signal; the repair chip RC outputs the signal, received through the input channel IN2, to a repair lead connected with the output channel OUT2 from the output channel OUT2 corresponding to the input channel IN2; by laser irradiation, the repair lead is connected with the repair line 13, and a connection point between the repair lead and the repair line 13 is a connection point "d"; the repair line 13 is also connected with a part, connected with a signal line (namely a data line), of the poor signal lead connected with the output channel 5 of the source driver IC1, and a connection point between the repair line 13 and the part is a connection point "c"; and hence the poor signal lead of data line connected with the output channel 5 of the source driver IC1 can be repaired.

The source driver IC2 outputs a signal, outputted to the signal lead of data line from the output channel 3, to the repair chip RC from the feedback channel FB1 of the source driver IC2; the repair chip RC determines that the signal is received from the feedback channel FB1 of the source driver IC2 according to the input channel IN3 for receiving the signal; the repair chip RC outputs the signal, received through the input channel IN3, to a repair lead connected with the output channel OUT3 from the output channel OUT3 corresponding to the input channel IN3; by laser irradiation, the repair lead is connected with the repair line 13, and a connection point between the repair lead and the repair line 13 is a connection point "e"; the repair line 13 is also connected with a part, connected with a signal line (namely a data line), of the poor signal lead connected with the output channel 3 of the source driver IC2, and a connection point between the repair line 3 and the part is "f"; and hence normal display can be achieved by transmitting the signal to source electrodes of TFT switches (the TFT switches are not shown in FIG. 3 and are disposed in the display area 12) of pixels connected with the data line. Thus, the poor signal lead of data line connected with the output channel 3 of the source driver IC2 can be repaired.

Because only one signal lead of data line in the signal leads of data lines connected with the source driver IC2 is poor, only the feedback channel FB1 in the two feedback channels of the source driver IC2 outputs signals, and the feedback channel FB2 will not output signals.

Because there is no poor signal lead of data line in the signal leads of data lines connected with the source driver IC3, the feedback channel FB of the source driver IC3 will not output signals.

Because the repair line 13 not only connects the part, connected with the signal line (namely the data line), of the poor signal lead connected with the output channel 2 of the source driver IC1 and the repair lead connected with the output channel OUT1 of the repair chip RC, but also connects the part, connected with the signal line (namely the data line), of the poor signal lead connected with the output channel 5 of the source driver IC1 and the repair lead connected with the output channel OUT2 of the repair chip RC, and connects the part, connected with the signal line (namely the data line), of the poor signal lead connected with the output channel 3 of the source driver IC2 and the repair lead connected with the output channel OUT3 of the repair chip RC, the portion between the connection point "a" and the connection point "b", the portion between the connection point "c" and the connection point "d", and the portion between the connection point "e" and the connection point "f" on the repair line 13 must be disconnected from each other to avoid signal interference.

In the above embodiments, the driver ICs are all disposed on the array substrate. In actual application, the driver ICs may also be disposed on a flexible circuit board for connecting an array substrate and a driving circuit board. The working mode of the driver ICs and the repair chips is described in the above embodiments only by taking the case that the signal leads to be repaired are disconnected or short-circuited in the external lead area as an example. Actually, in the case where poor contact occurs for the signal leads and the driver ICs, the working mode of the driver ICs and the repair chips are the same as that described in the above embodiments. In addition, the working mode of the driver ICs and the repair chips is described in the above embodiments by taking source driver ICs and data lines as an example. When the driver ICs are gate driver ICs and the signal lines are gate lines, the working mode of the driver ICs and the repair chips is the same as the working mode of the driver ICs and the repair chips when the driver ICs are source driver ICs and the signal lines are data lines.

The display panel provided by the embodiment may be an LCD panel, an OLED display panel or any other display panel employing driver ICs for drive. No limitation will be given in the embodiments of the present invention.

The embodiment of the present invention further provides a method for repairing a lead of driver ICs. The lead repair method is based on the display substrate provided by the embodiment of the present invention. As illustrated in FIG. 4, the method comprises the following steps:

S401: determining a poor signal lead occurring in the signal leads connected with the driver IC and transmitting a signal transmitted to the poor signal lead to the repair chip.

S402: determining a repair lead corresponding to the poor signal lead in the repair leads connected with the repair chip connected with the driver IC and transmitting the signal received by the repair chip to the repair line through the repair lead determined.

S403: connecting the repair line and the signal line connected with the poor signal lead.

In the step S402, as for one poor signal lead in one driver IC, the step of determining the repair lead corresponding to the poor signal lead in the repair leads connected with the repair chip connected with the driver IC includes: determining the repair lead, corresponding to the poor signal lead, in the repair leads connected with the repair chip according to the corresponding relationship between the feedback channel in the driver IC and the poor signal lead in the signal leads connected with the driver IC, the corresponding relationship between the input channel and the output channel in the repair chip connected with the driver IC, the corresponding relationship between the input channel in the repair chip and the feedback channel of the driver IC connected with the repair chip, and the repair leads connected with the output channels in the repair chip. The three kinds of corresponding relationships and the repair leads connected with the output channels in the repair chip are preset in the display substrate.

Figure 5:
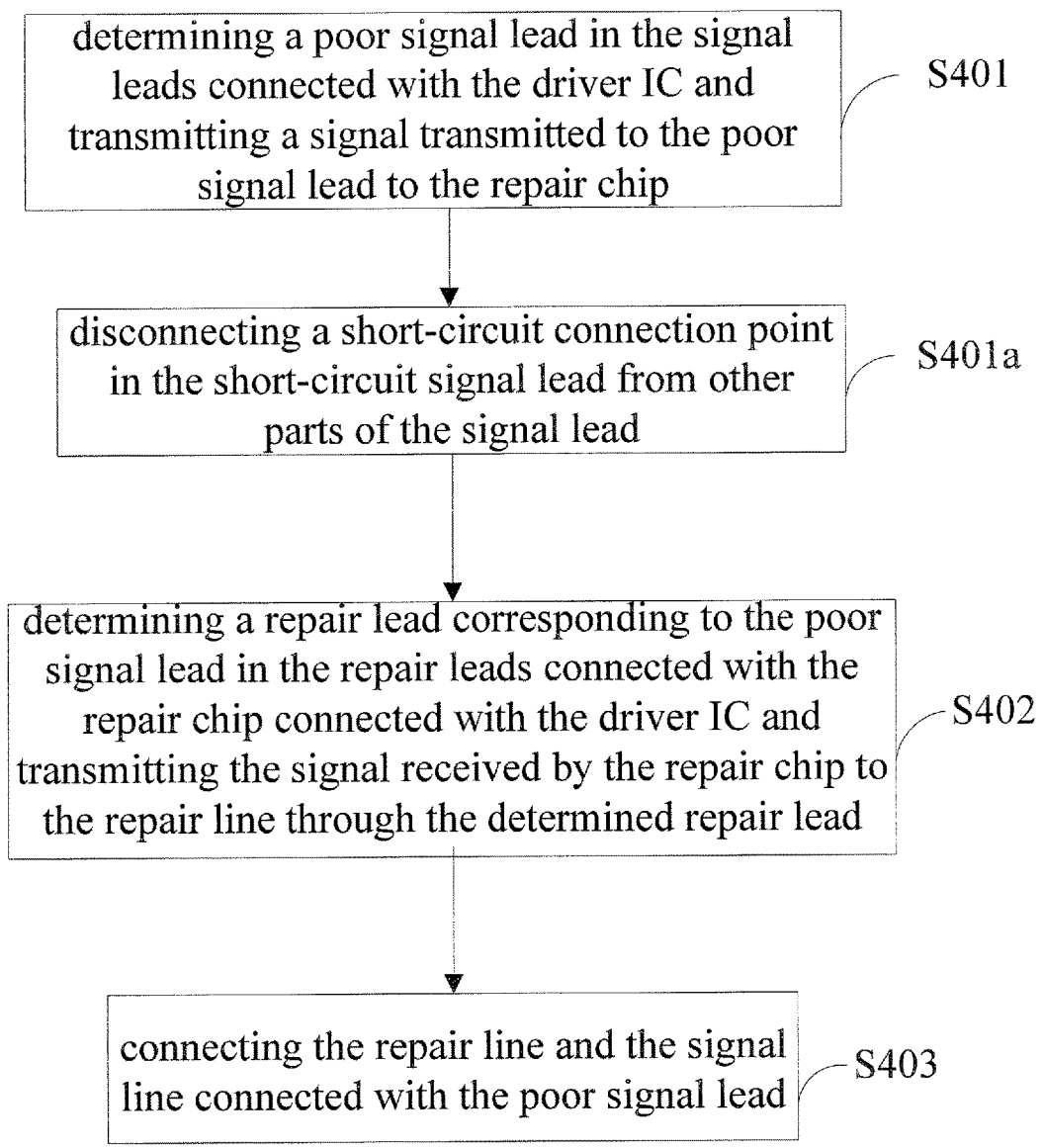
FIG. 5 is a flowchart of a lead repair method of the driver ICs, provided by another embodiment of the present invention.

Moreover, where there is a short-circuit signal lead in the poor signal leads, in S402, before the step of determining the repair lead corresponding to the poor signal lead in the repair leads connected with the repair chip, as illustrated in FIG. 5, the lead repair method provided by the embodiment of the present invention further comprises the following step:

S401a: disconnecting a short-circuit connection point in the short-circuit signal lead from other portions of the signal lead, so that the short-circuit signal lead is converted into the disconnected signal lead, and hence the driver IC connected with the short-circuit signal lead can detect that the signal lead is poor and outputs a signal outputted to the poor signal lead to the repair chip connected with the driver IC.

Steps S401 and S401a are not necessarily sequential. S401 may be executed at first and hence S401a is executed. Or S401a is executed once after one short-circuit signal lead is determined, and hence whether the next signal lead is poor is determined. When there is no short-circuit signal lead in the determined poor signal leads, S401a is not required to be executed. Thus, S401a is not an indispensable step.

Figure 6:
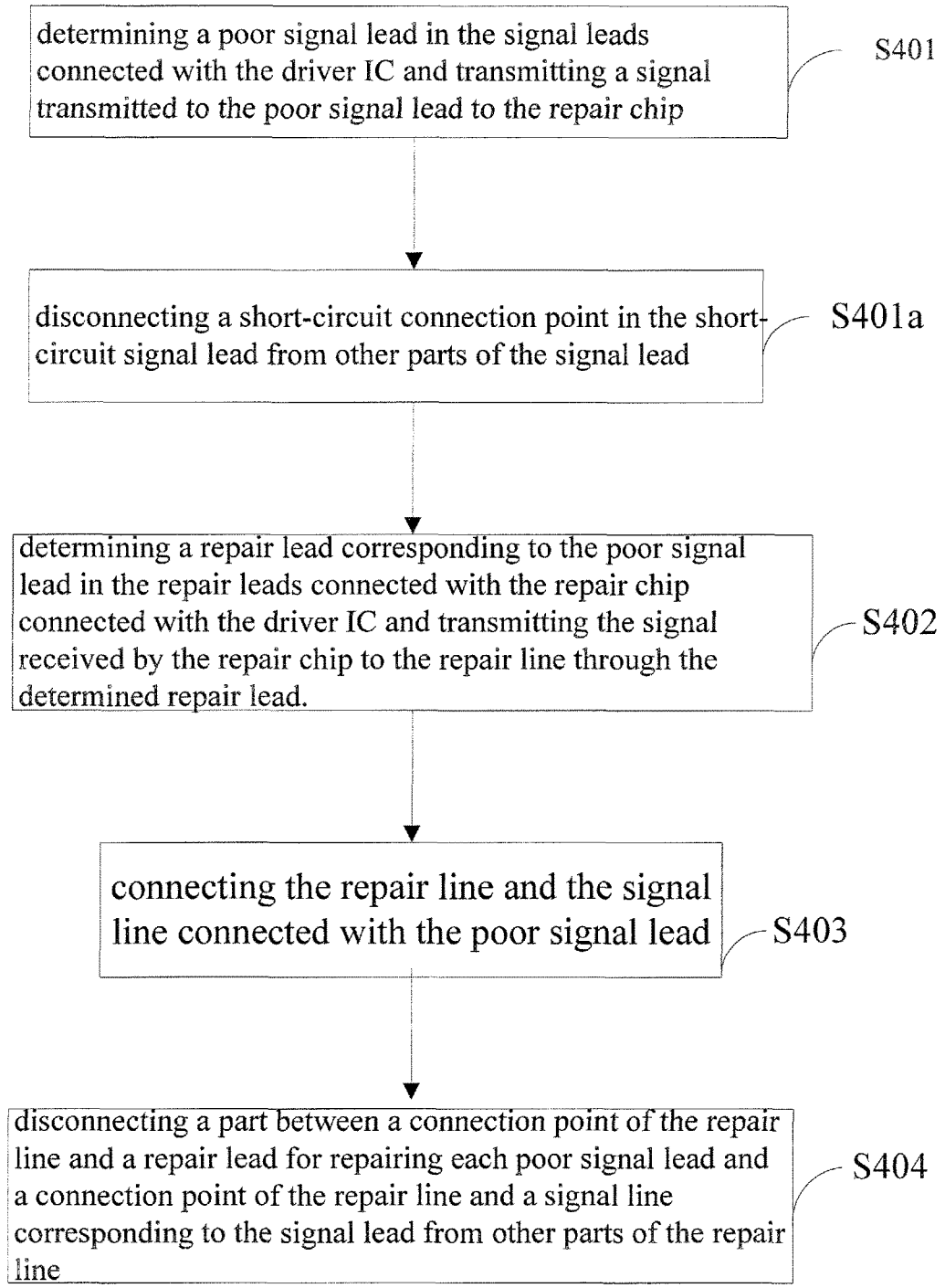
FIG. 6 is a flowchart of a lead repair method of the driver ICs, provided by still another embodiment of the present invention.

Moreover, when the same repair line must connect two or more than two repair leads and connecting parts of signal lines and poor signal leads corresponding to the repair leads, as illustrated in FIG. 6, after S403, the lead repair method provided by the embodiment of the present invention may further comprise the following step:

S404: disconnecting a portion between a connection point between the repair line and a repair lead for repairing each poor signal lead and a connection point between the repair line and a signal line corresponding to the signal lead from other parts of the repair line.

If one repair line only connects one repair lead and a connecting part of poor signal lead corresponding to the repair lead and corresponding signal line, after S403, S404 may be executed and may also be not executed.

It should be clearly understood by those skilled in the art from the description of the above embodiments that the embodiments of the present invention may be implemented by hardware and may also be implemented by software and a necessary general hardware platform. Based on the understanding, the technical solutions of the embodiments of the present invention may be embodied in the form of software products. The software product may be stored into a non-volatile storage medium (may be a CD-ROM, a USB drive, a portable hard drive, etc.) and includes a plurality of instructions for instructing a computer device (may be a personal computer, a server, a network device, etc.) to execute the method provided by the embodiments of the present invention.

It should be understood by those skilled in the art that the accompanying drawings are only schematic diagrams of one preferred embodiment and modules or processes in the accompanying drawings are not necessarily required for implementing the present invention.

It should be understood by those skilled in the art that the modules of the devices in the embodiments may be distributed in the devices of the embodiments in accordance with the description of the embodiments and may also be varied correspondingly and disposed in one or more devices different from the embodiment. The modules of the embodiment may be combined into a module and may also be further divided into a plurality of sub-modules.

The serial numbers of the embodiments of the present invention are only used for description and do not reflect the priority of the embodiments of the present invention.

Obviously, various modifications and deformations can be made to the present invention by those skilled in the art without departing from the spirit and scope of the present invention. Therefore, if the modifications and deformations of the present invention fall within the scope of the appended claims of the present invention and equivalents thereof, the present invention is also intended to include the modifications and deformations.

The invention claimed is:

1. A display substrate, comprising: a plurality of signal leads, at least one driver integrated circuit (IC), at least one repair chip, at least one repair lead and at least one repair line disposed on the display substrate, wherein the repair chip is connected with the at least one driver IC; the repair lead is connected with the repair chip; the repair line is intersected with a plurality of signal lines connected with the plurality of signal leads and insulated from the signal lines;

the driver IC is configured to output signals, outputted to a defective signal lead, to the repair chip in the case of the defective signal lead occurring among the signal leads connected with the driver IC;

the repair chip is configured to output a signal which is outputted by the driver IC to the repair lead connected with the repair chip;

the repair lead is configured to transmit a signal outputted by the repair chip to the corresponding repair line; and when the repair line receives the signal from the repair lead, the connection between the repair line and a signal line connected to the defective signal lead is conductive, and hence the repair line transmits the signal to the signal line.

2. The display substrate according to claim 1, wherein the repair lead is disposed in an external lead area of the display substrate.

3. The display substrate according to claim 1, wherein the repair line is disposed along an edge of a display area of the display substrate.

4. The display substrate according to claim 1, wherein the driver IC is provided with a feedback channel; the repair chip is provided with an input channel and an output channel corresponding to the input channel; the input channel of the repair chip is connected with the feedback channel of the driver IC; the output channel of the repair chip are connected with the repair lead;

the driver IC is configured to: output a signal, outputted to defective signal lead, to the repair chip through the feedback channel corresponding to the signal lead in the case of the defective signal lead; and the repair chip is configured to: receive the signal, outputted by the driver IC through the feedback channel of the driver IC, from the input channel of the repair chip, and output the received signal to the repair lead connected with the output channel through the corresponding output channel.

5. The display substrate according to claim 1, wherein the driver ICs are source driver ICs; the plurality of signal leads on the display substrate are signal leads of data lines; and the repair line is configured to transmit the received signal which is transmitted from the repair lead to a data line connected with the defective signal lead connected with the repair line.

6. The display substrate according to claim 1, wherein the driver ICs are gate driver ICs; the plurality of signal lines on the display substrate are signal leads of scanning lines; and the repair line is configured to transmit the received signal which is transmitted from the repair lead to a scanning line connected with the defective signal lead connected with the repair line.

7. The display substrate according to claim 1, wherein the repair line and the signal lines connected with the plurality of signal leads on the display substrate are intersected with each other, arranged on different layers of the display substrate, and electrically insulated through an insulating layer.

8. The display substrate according to claim 1, wherein when the repair line receives the signal transmitted by the repair lead, the repair line is connected with a signal line connected with the defective signal lead and transmits the received signal transmitted by the repair lead to the signal line.

9. The display substrate according to claim 1, wherein the driver IC is disposed on the display substrate.

10. The display substrate according to claim 1, wherein the driver IC is disposed on a flexible circuit board which is configured to connect the display substrate and a driving circuit board for providing driving signals to the display substrate.

11. A method for repairing a lead of driver ICs, comprising:
providing at least one repair chip, at least one repair lead and at least repair line, wherein the at least one repair chip is connected with the driver IC; the at least one repair lead is connected with the repair chip; and the repair line is intersected with signal lines connected with signal leads connected with the driver IC and insulated from the signal lines;
determining a defective signal lead occurring in the signal leads connected with the driver IC and transmitting a signal transmitted to the defective signal lead to the repair chip;
determining a repair lead related to the defective signal lead in the repair chip, and transmitting the signal received by the repair chip to the repair line through the repair lead, wherein the repair chip is connected with the driver IC;
connecting the repair lead and the signal line connected with the defective signal lead when the repair line receives the signal from the repair lead, the connection between the repair line and a signal line connected to the defective signal lead is conductive, and hence the repair line transmits the signal to the signal line.

12. The method according to claim 11, in response to a short-circuit signal lead for the defective signal lead, before determining the repair lead connected with the defective signal lead in the repair chip, further comprising:
disconnecting a short-circuit connection point in the short-circuit signal lead from other portions of the short-circuit signal lead.

13. The method according to claim 11, in response to a plurality of defective signal leads occurring, after connecting the repair line and the signal line connected with the defective signal lead, further comprising:
disconnecting a part, between a connection point of the repair line and corresponding repair lead for repairing each defective signal lead and a connection point of the repair line and a signal line corresponding to the signal lead, from other parts of the repair line.

14. The method according to claim 12, in response to a plurality of defective signal leads occurring, after connecting the repair line and the signal line connected with the defective signal lead, further comprising:
disconnecting a part, between a connection point of the repair line and corresponding repair lead for repairing each defective signal lead and a connection point of the repair line and a signal line corresponding to the signal lead, from other parts of the repair line.

* * * * *